Oct. 12, 1943.　　　　E. RUSCO　　　　2,331,730
MARKER MECHANISM
Filed March 27, 1942　　　3 Sheets-Sheet 2
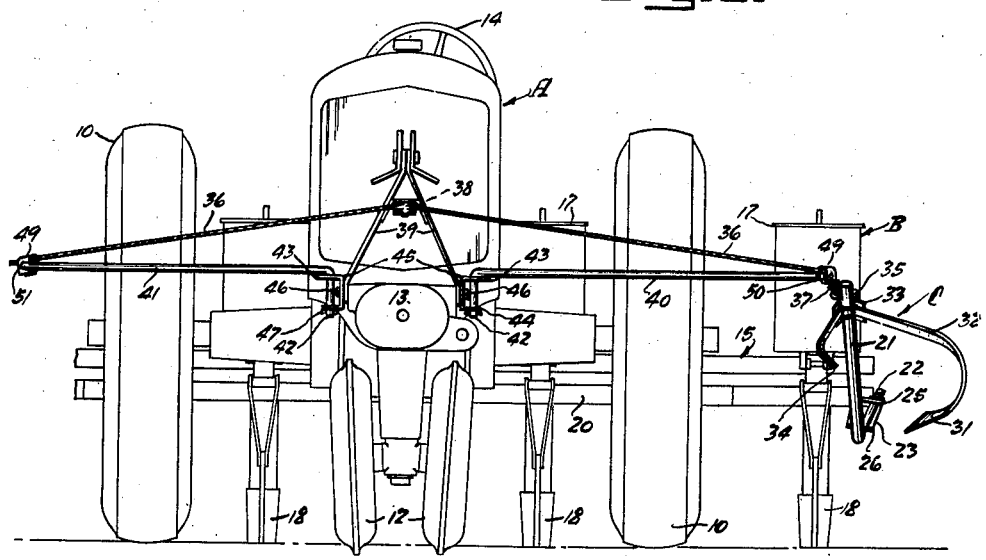
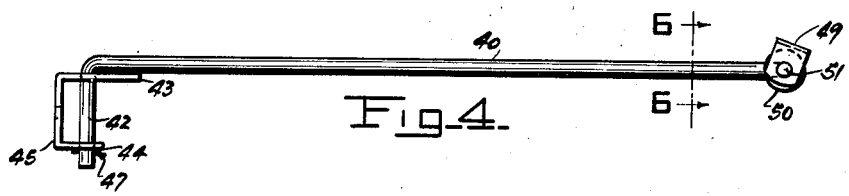
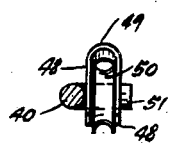
Inventor
EASBORN RUSCO
By Carlsen & Hayle
Attorney

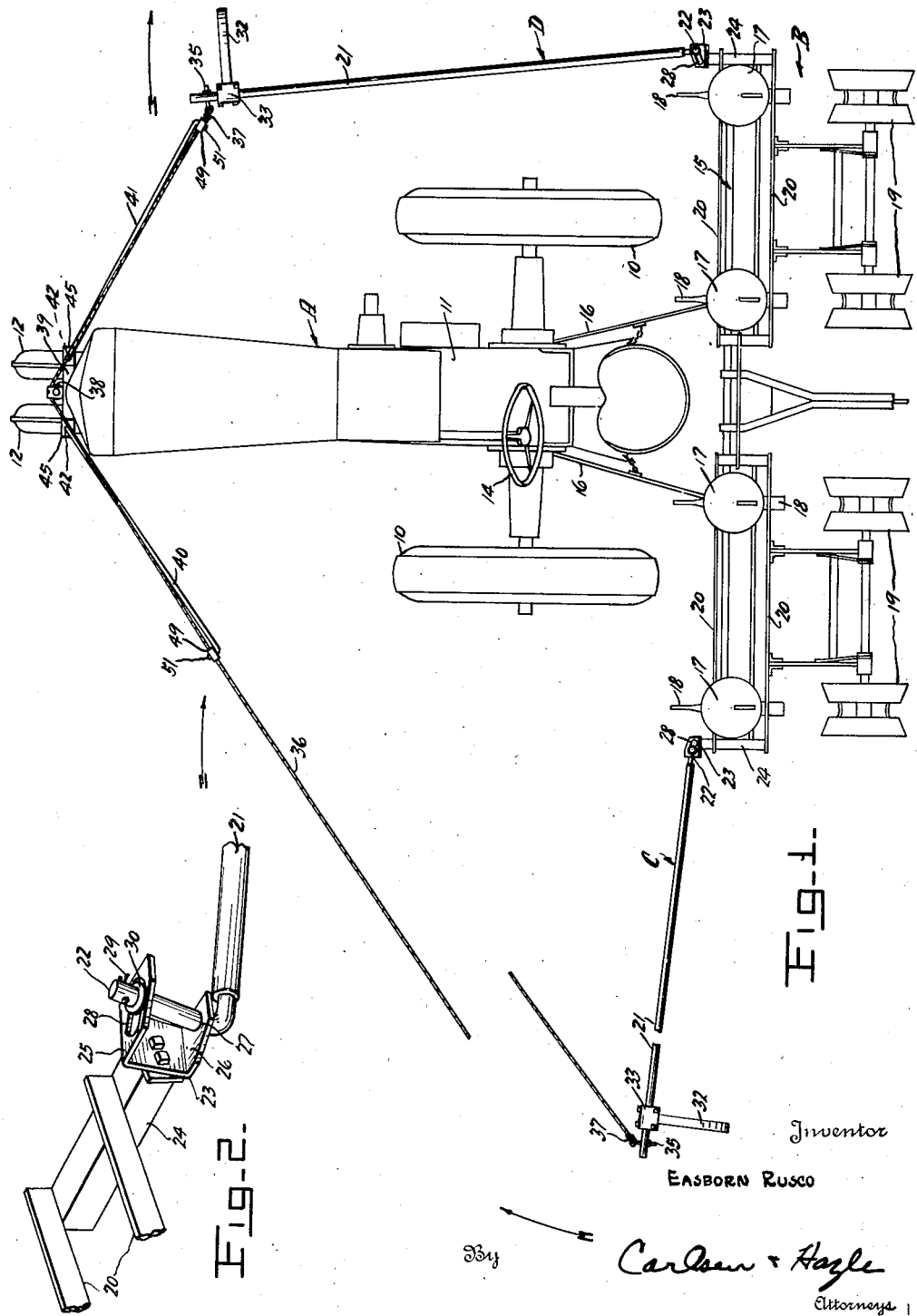

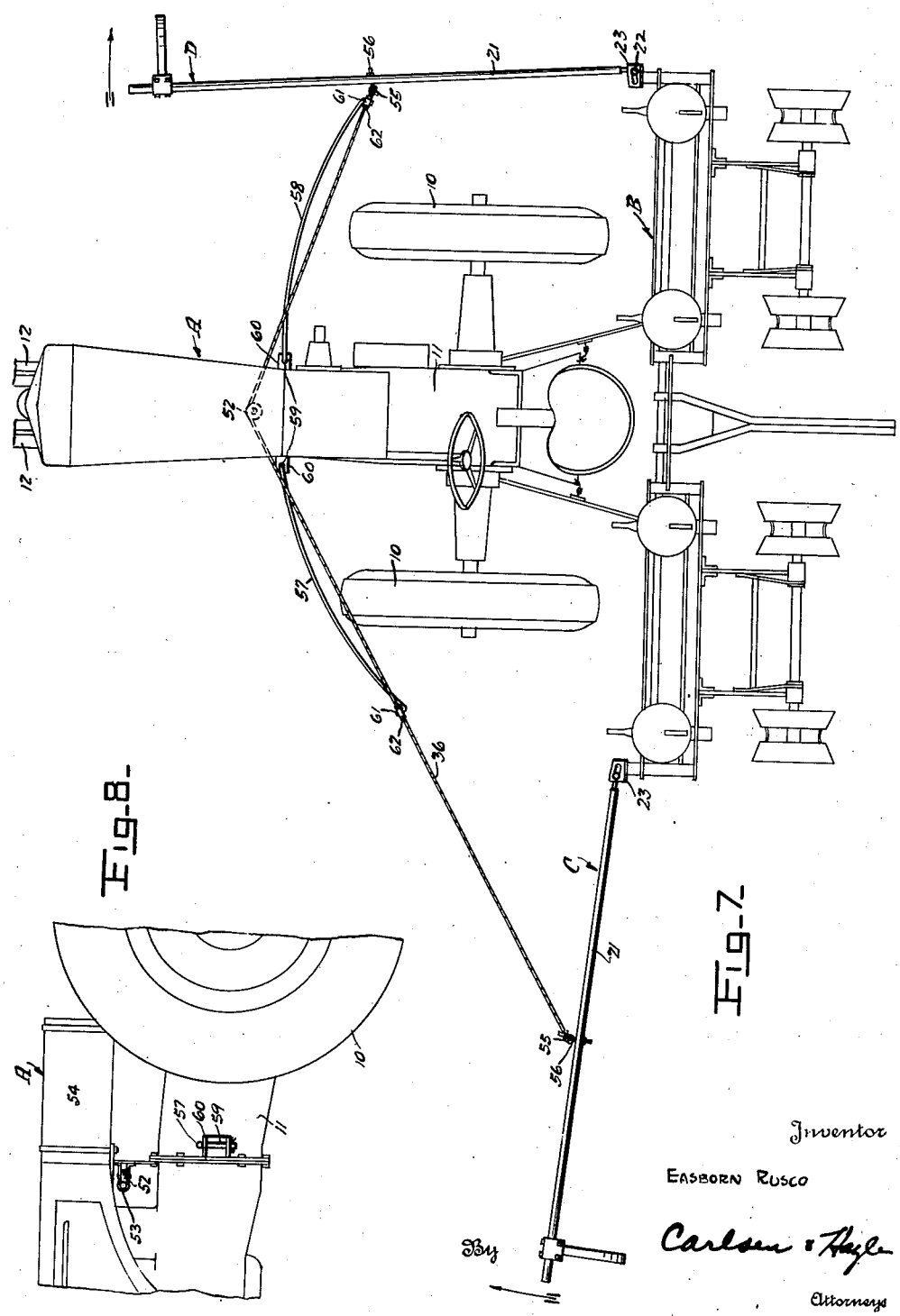

Patented Oct. 12, 1943

2,331,730

UNITED STATES PATENT OFFICE 2,331,730

MARKER MECHANISM

Easborn Rusco, Moline, Ill., assignor to Minneapolis-Moline Power Implement Company, Minneapolis, Minn., a corporation of Delaware Application March 27, 1942, Serial No. 436,409

10 Claims. (Cl. 97—230)

This invention relates generally to improvements in markers for use in connection with farm implements for making a mark in the ground along the land side of the implement as a guide to the operator for spacing the next swath.

Some implements, particularly planters and drills where accuracy in row spacing is most required, do not leave a distinct mark in the ground unless soil conditions are exactly favorable and even when such marks are present it is difficult for the operator traveling the next swath to properly guide his implement since the marks are so far aside from his new path as to make accurate judgment of distances well nigh impossible. To overcome this difficulty it is the custom to provide marker attachments which form a mark or small furrow in the ground to the land side of the implement and which will fall in, or nearly in, the path of the front wheels of the pulling tractor on the next swath to make proper guidance easy. Such markers are usually in pairs, one at either side of the implement, and are alternately moved from outspread, working positions to folded, idle positions as the implement goes back and forth across the field.

In the usual versions of these planting implements the markers are supported at rear or inner ends to outer ends of the planter frame and fold forwardly from their working positions to their idle positions alongside the tractor or the forward positions of the implement, this folding being accomplished automatically in a well known manner as the implement is turned at the ends of the rows. However, the forward end of the idle marker usually has only a small fraction of its weight supported and as a result the weight of the marker has caused a considerable twisting stress to be placed upon the planter frame. This is particularly noted in travel over rough ground and has caused much undue flexing and abuse of the planter frames.

To my knowledge attempts have been made to better support the markers, when idle, in order to avoid this twisting action, but all such arrangements have either been complicated in construction, required manual or power manipulation of the markers, or have been difficult to attach to and remove from the tractor when the implement is connected thereto and disconnected therefrom.

Having in mind the foregoing it is the primary object of my invention, therefore, to provide a marker mechanism which will adequately support the idle marker to relieve the planter frame of all twisting stresses and which nevertheless will permit the usual automatic shifting of the markers from working to idle positions. Another object is to provide mechanism of this kind in a simple and inexpensive form, and which may be very readily attached to and detached from the tractor.

These and other more detailed and specific objects will be disclosed in the course of the following specification, reference being had to the accompanying drawings, in which—

Fig. 1 is a plan view of a tractor and planter implement assembly employing my novel marker mechanism, one marker being shown in idle position and the other in working position and only the rough outline of the tractor planter being shown.

Fig. 2 is an enlarged fragmentary perspective view of the connections and supports for the rear or inner ends of the markers.

Fig. 3 is an enlarged front end elevation of the assembly of Fig. 1, a portion of the planter and one marker being removed.

Fig. 4 is an enlarged frontal elevation of one marker end supporting means.

Fig. 5 is a top plan view thereof.

Fig. 6 is an enlarged cross section along the line 6—6 in Fig. 4.

Fig. 7 is a view similar to Fig. 1 but showing a modified arrangement of the marker supporting mechanism.

Fig. 8 is a fragmentary, central side elevation of the tractor of Fig. 7 showing the supporting means for the marker mechanism.

Referring now more particularly and by reference characters to the drawings, A designates the tractor and B the planter of a conventional type of implement combination and to and with which the markers C and D are connected. The tractor is of usual form including main traction wheels 10, a frame or body 11 and forward dirigible wheels 12 steered by suitable mechanism in the steering housing 13, under control of the steering wheel 14.

The planter B comprises a frame 15 having draft connections 16 with the tractor and supporting the seed measuring units 17 from which the seed is dropped into the planter shoes 18. The seed is covered by the press wheels 19 arranged behind each shoe, a four row planter being here shown. The frame 15 includes transversely extending frame bars 20.

The markers C and D each includes an elongated member or arm 21 which at its rear or inner end carries a generally upwardly turned pivot finger or pin 22 disposed at somewhat less than a right angle to the axis of the arm. The finger 22 of each marker is attached to a bracket 23 secured at the forward end of a bar 24 mounted across the ends of the frame bars 20 and disposed, therefore, at extreme outer ends of the planter as a whole. The bracket 23 includes upper and lower flanges 25 and 26 which slope outwardly and downwardly with respect to the planter frame and the lower flange has an opening 27 loosely receiving the upwardly turned finger 22, while the upper flange 25 has an elongated slot 28 likewise receiving the finger. The finger is held against downward displacement by a cotter pin 29 and washer 30. The slot 28 angles forwardly and outwardly with respect to the planter frame as best seen in Figs. 1 and 2.

The actual marking element of each marker is a tooth or point 31 formed at the end of a curved shank 32 which is secured to the arm 21 by a clamp 33 permitting adjustment of the point along the arm to vary the distance at which the mark is made from the landside of the planter. The shank 32 also depends from the clamp 33 and terminates in a gauge shoe or curved end 34 which gauges the penetration of the point into the ground. Obviously a disk or other mark forming device might be used as well.

The free ends of the marker arms 21 in the structure shown in Figs. 1 to 6 carry eye bolts 35 to which are tied the ends of a rope or flexible connecting member 36 as designated at 37, the mid-portion of the rope being passed over a pulley 38 journaled upon a bracket 39 bolted to the front of the steering house 13 at the front of the tractor. The rope is of such length that either marker may extend from the planter in an outspread, lateral working position while the other extends forwardly in a folded, idle position alongside the tractor as seen in Fig. 1.

The foregoing constitutes one well known form of marker mechanism as thus far described. In operation one marker extends outwardly from the landside of the planter so that its point 31 will form a furrow in the soil and thus make a readily visible mark which the tractor operator may follow on his return trip. Preferably, the mark is made at such distance from the tractor that it will fall in, or very near, the path of the front wheels of the tractor on the next trip. When the tractor reaches the end of the row it, of course, is turned toward the side at which the marker is down, or in operating position, and the result is a partial collapsing or folding movement between the down marker and tractor while the slackening of the rope 36 will permit the idle marker to start its swing outward and downward towards its working position. As soon as this previously idle marker contacts the ground it completes its movement toward working position drawing the other marker to its idle or folded position. Rearward movement of the markers beyond working positions is usually prevented by forming knots or typing small bolts (neither here shown) in the rope 36 in proper positions to engage the pulley and limit movement of the rope therethrough.

The angularity of the bracket flanges 25, 26, the fingers 22, and slots 28 play an important part in the operation of the markers. The slots 28 permit the working marker to angle downwardly, outwardly and slightly forwardly from the planter, while permitting the marker to rise and clear an obstruction in the ground without damage. The upper end of the finger 22 will of course swing inward and upward in the slot as this occurs, affording a floating action. Of more importance, however, the pivot axes for the markers are so disposed that, as either marker swings forwardly, it is also elevated or angled upwardly at its forward end by the acute angle between the finger and marker arm. As the marker reaches idle position then the weight of the marker point 31 and shank 32 will retain the finger at the outer end of the slot 28 (Fig. 3), due to the torque exerted on the marker arm, and thus when the strain on the rope 36 is relieved, by the initial folding of the working marker as the tractor starts its turn, the idle marker has a definite tendency to swing outward of its own weight. This action continues with increasing advantage until the point strikes the ground and pulls the marker to working position.

It will be noted that in the structure thus far described the forward end of the idle marker is only partially supported by the rope 36 and the weight of the marker will have considerable twisting effect on the planter frame 15. This is particularly noticeable under rough soil conditions and the weight of the marker, marker point and shank is sufficient to twist the frame or even cause breakage thereof, as the forward end of the marker works up and down.

In accordance with my invention I provide for the markers a pair of supporting members or arms 40—41 which have downwardly turned pivot ends 42 received in the apertured upper and lower flanges 43—44 of brackets 45 and secured by bolts 46 to the forward end of the tractor. The brackets are mounted beneath the pulley 38 and as here shown they are mounted by the same bolts which mount the pulley bracket 39. The pivot ends 42 thus are disposed for movements about substantially vertical axes allowing the supporting arms 40—41 to swing in horizontal planes at opposite sides of the tractor. The upper flanges 43 of the brackets are elongated (Figs. 3-5) to provide a substantial support and bearing surface for the arms and to hold the same against downward swinging displacement. Cotter pins or keys 47 in lower ends of the pivot parts of the arms prevent their upward movement but permit convenient removal of the arms from the tractor when necessary.

At their outer or free ends the extremities 51 of the supporting arms 40—41 are turned angularly through the sides 48 of inverted U-shaped pulley blocks or frames 49 within which pulleys 50 are journaled upon these ends 51. The blocks 49 are welded, or otherwise secured, to the arms themselves.

The marker connecting rope 36 after passing around the pulley 38 is now passed through the pulley blocks 49 and over the pulleys 50 on its way to the tie connections at 37 with the ends of the marker arms 21 of the respective markers C and D so that the pulleys act as guide means for the rope. Now as either marker is pulled up and folded toward its idle position the rope running over the pulley 50 on the supporting arm at that side keeps the arm in alignment with the rope. As the marker reaches folded position, however, the knot or tie 37 stops against the pulley as seen in Figs. 1 and 3 limiting further movement and, of course, likewise holding the other marker in working position against rearward movement. Thus the need of stop knots in the rope for contacting the pulley 38 is eliminated.

As the idle marker thus comes to rest with the tie 37 against the pulley 50, the arm 40 or 41 on that side is enabled to support the weight of the forward end of that marker thus preventing the marker from bobbing or working up and down and relieving the planter frame of the twisting strains incident to such actions. The pull on the rope by the working marker is sufficient to hold the idle marker tightly against its supporting arm for this purpose, and the arms themselves are of such length as to properly meet the markers and of such rigidity as to support the same.

It will be seen from the foregoing that the supporting arms 40 and 41 being rigid against vertical flexing movements will serve as effective supports for the markers while idle but, since the arms may swing freely in horizontal planes from front to rear, they will interfere in no way with the normal automatic folding actions of the markers. The supporting arms may be easily and quickly attached to or detached from the tractor or planter.

Marker supports of this nature may be arranged in connection with implements of any kind where required and, where the implement is not of the tractor attached type as here shown, may be arranged wholly on the implement itself. In the latter case, of course, the arms 40—41 and brackets 45 will be attached to a part of the implement instead of to the tractor as disclosed herein. Such variations are considered within the scope of my invention.

Referring now to Figs. 7 and 8 of the drawings more specifically, I show therein a marker supporting structure which may serve to give even better support to the marker arms. The tractor A, planter B and markers C and D are here exactly the same as the structure previously described and are accordingly referred to by similar reference characters throughout. However, the tie rope or flexible connecting member 36 in this case, instead of running across the front of the tractor, crosses it at about its center in the fore and aft direction, running over a pulley 52 secured by its bracket or frame 53 to a supporting part of the tractor beneath the tank 54 or in any similar position which will permit free lateral passage and movement of the rope. The ends of the rope are then tied at 55 to eye bolts 56 which in this case are located near the center or intermediate portions of the marker arms 21. Obviously when thus connected the rope 36 will cause the usual operation of the markers to be carried out equally as well as the structure previously described.

The marker supporting member or arms 57 and 58 are now connected by their pivot ends 59 to brackets 60 which are secured to the sides of the tractor adjacent the position of the pulley 52 so that the arms may swing forwardly and rearwardly alongside the tractor in generally horizontal and longitudinal planes. The free ends of the arms 57—58 here also have pulley blocks 61 supporting pulleys 62 over which the rope 36 runs on its way between the center pulley 52 and tie points 55.

In operation as the markers reach their idle positions they are drawn tight against the pulleys 62 at the ends of the supporting arms 57 and 58 and these arms then serve to support the weight of the markers exactly as has been described. In this structure, however, the markers are supported near their centers by the arms 57 and 58 and as a result they are substantially balanced about such support points, transferring all, or practically all, of their weight to the supporting arms. In any event it is apparent that the support would be greater than that afforded by arranging the arms at the front of the tractor or implement and this may be the preferable arrangement in some cases.

The supporting arms 57 and 58 may be curved somewhat as clearly shown in Fig. 7 if necessary in order to cause them to clear the tractor wheels 10.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. The combination with an implement marker mechanism of the character described having arms foldable about supported ends from outspread working positions to folded idle positions, of supporting arms swingable about end connections with the implement and arranged to supportably engage the marker arms as they reach their folded positions.

2. In a marker mechanism for an implement and including marker members pivoted at one end to the implement for swinging movements at their other ends toward and away from the implement, means for additionally supporting the marker members as they are swung toward the implement, said means comprising supporting members movably connected to the implement and adapted to support said other ends of the marker members as they swing toward the implement.

3. In an agricultural implement having marker arms pivotal about inner end connections with the implement for alternate forward and rearward folding movements at outer ends from outspread working positions to folded positions alongside the implement, a tie rope connecting the outer ends of the marker arms and operative to pull one marker inward to folded position when the other is swung outward to working position, supporting members pivotally connected at their ends to and extending from the implement toward the position assumed by the marker ends in their idle position, and said tie rope having running engagement over the supporting members to draw the idle markers up into supported relation with said members.

4. In an agricultural implement having marker arms pivotal about inner end connections with the implement for alternate forward and rearward folding movements at outer ends from outspread working positions to folded positions alongside the implement, a tie rope connecting the outer ends of the marker arms and operative to pull one marker inward to folded position when the other is swung outward to working position, supporting members pivotally connected at inner ends to the implement and extending at outer ends into the path of the markers as they swing to idle positions, pulleys on outer ends of the supporting members, and said tie rope having running engagement over the pulleys whereby the idle markers will be supported by the rope directly from the outer end of said supporting members.

5. In an agricultural implement having marker arms pivotal about inner end connections with the implement for alternate forward and rearward folding movements at outer ends from outspread working positions to folded positions alongside the implement, a tie rope connecting the outer ends of the marker arms and operative to pull one marker inward to folded position when the other is swung outward to working position, supporting members pivotally connected at inner ends to the implement and extending at outer ends into the path of the outer ends of the markers as they fold to idle positions, pulley frames secured to the outer ends of the supporting members, pulleys in said frames, the ends of said members being angularly turned to act as pivots for the pulleys, and the said tie rope being run at its ends through the frames and over the pulleys to thereby draw the idle markers up into supported relation with the supporting members.

6. The combination with a planter and tractor assembly having marker arms pivotally connected to the planter for forward and rearward folding movements from outspread working positions to forwardly folded idle positions alongside the tractor and a tie rope connecting the outer ends of the arms for drawing one to folded positions automatically as the other swings toward its working position, of supporting members detachably and swingably connected at inner ends to a forward part of the tractor, rope guide means on outer ends of the supporting members, and said tie rope being run over said guide means whereby it will draw up the idle markers to the outer ends of the members and transfer the weight of the markers directly to the forward part of the tractor.

7. The combination with a tractor and implement assembly having marker arms pivotally connected at one end to the implement for forward and rearward folding movements at their other ends from outspread working positions to idle positions alongside the tractor, of a tie rope connected at its ends to the marker arms intermediate the ends thereof and operative to fold one marker arm to idle position as the other unfolds toward its working position, and supporting members arranged on the tractor and engaging the tie rope in such manner as to support the idle marker arms intermediate their ends.

8. The combination with a tractor and implement assembly having marker arms pivotally connected at one end to the implement for forward and rearward folding movements at their other ends from outspread working positions to idle positions alongside the tractor, of a tie rope connected at its ends to the marker arms intermediate the ends thereof and operative to fold one marker arm to idle position as the other unfolds toward its working position, supporting arms pivotally connected to the tractor and extending outwardly and laterally therefrom, rope guide means on outer ends of the supporting arms, and said tie rope being run over said guide means whereby it will draw the intermediate portions of the idle markers against said outer ends of the supporting arms to support the weight of said arms.

9. The combination with a tractor having a narrow forward end portion and planter assembly having widespread marker mounting means adjacent its rear end and marker arms pivotally connected at one end to said mounting means for folding movements from outspread working positions to forwardly extending idle positions alongside but spaced laterally away from the said narrow forward end portion of the tractor, of a tie rope tied at its ends to and connecting the marker arms and operative to fold either to idle position as the other unfolds to working position, and elongated supporting arms extending laterally outward from the tractor and adapted at their outer ends to engage the tie rope and to project into the path of the arms as they fold to idle positions to thereby support said arms, and the supporting arms being swingably connected at their inner ends to the tractor whereby their outer ends may swing to points exactly in line with the tied ends of the rope as the markers are folded.

10. The combination with an implement structure having a wide rear end portion and comparatively narrow frontal portion and having marker arms pivotally mounted at its rear end for swinging movements from outspread working positions to forwardly folded idle positions outwardly of and spaced from the frontal portion of the implement and a tie rope connecting the markers to fold one to idle position as the other is unfolded to working position, of elongated arms connected to the narrow frontal portion of the implement and extending outwardly therefrom, the outer ends of the supporting arms being positioned to reach the marker arms as they reach their idle positions and having rope guide means to engage the rope, and the inner ends of the supporting arms being pivotally connected to the implement whereby their outer ends may swing forwardly and rearwardly and into positions coinciding with the points at which the tie rope is connected to the marker arms.

EASBORN RUSCO.